United States Patent
Edland

(10) Patent No.: US 6,951,158 B1
(45) Date of Patent: Oct. 4, 2005

(54) SYSTEM COMPRISING A SCREW AND A TOOL THEREFOR

(76) Inventor: Jone Edland, Ekraveien 65C, Oslo (NO), N-0756

( * ) Notice: Subject to any disclaimer, the term of this patent is extended or adjusted under 35 U.S.C. 154(b) by 0 days.

(21) Appl. No.: 10/089,673

(22) PCT Filed: Oct. 9, 2000

(86) PCT No.: PCT/NO00/00333

§ 371 (c)(1),
(2), (4) Date: Apr. 2, 2002

(87) PCT Pub. No.: WO01/27479

PCT Pub. Date: Apr. 19, 2001

(30) Foreign Application Priority Data

Oct. 8, 1999 (NO) ................................. 994934

(51) Int. Cl.[7] ............................................. B25B 23/00
(52) U.S. Cl. ........................................ 81/460; 411/404
(58) Field of Search ...................... 81/460, 436, 451, 81/461, 121.1; 411/403–405, 410, 919

(56) References Cited

U.S. PATENT DOCUMENTS

| | | | |
|---|---|---|---|
| 2,800,829 A | * | 7/1957 | West ........................ 411/404 |
| 3,273,442 A | | 9/1966 | Launay |
| 4,258,596 A | | 3/1981 | Bisbing et al. |
| 5,171,117 A | * | 12/1992 | Seidl .......................... 411/404 |
| 5,279,190 A | | 1/1994 | Goss et al. |
| 5,553,983 A | | 9/1996 | Shinjo |
| 6,017,177 A | | 1/2000 | Lanham |

FOREIGN PATENT DOCUMENTS

| | | |
|---|---|---|
| DE | 44 13 782 | 9/1994 |
| EP | 0 257 664 | 3/1988 |
| EP | 0 933 538 | 4/1999 |
| EP | 0 961 042 | 12/1999 |
| EP | 1 039 151 | 9/2000 |
| GB | 2 261 483 | 5/1993 |
| GB | 2 329 947 | 4/1999 |
| NO | 128968 | 5/1974 |

* cited by examiner

*Primary Examiner*—Debra S. Meislin
(74) *Attorney, Agent, or Firm*—Merchant & Gould, P.C.

(57) ABSTRACT

System comprising a crew and a tool (6) therefore, in which the screw head (1) with a slot (2), the slot (2) having a first recess (3) with an approximately straight-walled cross section, and the tool being provided with an engagement section (16) that is complementary to the first recess (3). The slot has a second recess (11) at the bottom of the first recess (3), with a smaller diameter than that of the recess (3), and the tool (6) is provided with a central point (17) that complements the second recess (11). The second recess (11) has a circular cross section and the central point (17) has a circular cross section.

3 Claims, 2 Drawing Sheets

SYSTEM COMPRISING A SCREW AND A TOOL THEREFOR

Figure 1:
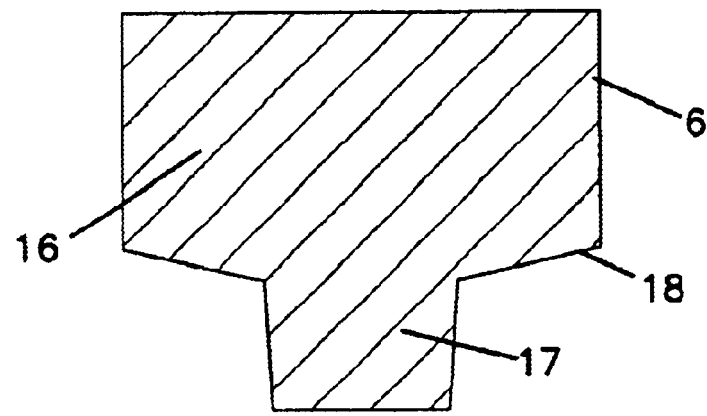

The present invention relates to a system comprising a screw and a tool; a screw constituting part of the system and a tool constituting part of the system.

Screws are known to feature a number of differently shaped slots. The oldest screw slot is a straight slot that extends diametrically across the screw head. In order to screw such a screw, use is made of a screwdriver that has a flat front with a straight front edge.

The straight slot has several well-known disadvantages. Therefore, new screw slots have been developed with a view to avoiding these disadvantages. Among these are the cross-slots, which mainly appear as Philips® slots and Pozidrive® slots.

At the end of the 1960s, the Torx® slot appeared. This has been described in detail in NO 128968. In the axial direction, this screw slot has the general shape of a star with six points, where the points are slightly rounded. The walls of the slot that extend down into the screw head are straight. The tool has been designed to be complementary to the slot. The Torx® slot remedies many of the disadvantages that are associated with for instance cross-slots. For all that, the Torx® slot still has some serious disadvantages. Since the walls are straight, the slot depth will be limited, particularly in conical screw heads, or so-called countersunk heads. If the depth becomes too great, the walls of the screw head will become very thin at the bottom of the slot, and the screw head may easily break off in this area.

Due to the depth limitation, the engagement between the tool and the slot will not be very good, and the tool may wobble as the screw is screwed in or out. The limited engagement between the tool and the screw also causes the screw to hang badly off the tool when the tool and the screw are held approximately horizontally. For craftsmen who have to screw a great number of screws, it is of great importance that the screw hangs on the tool until the screw has caught in the material into which it is being screwed. As the tool wears, its ability to retain the screw will worsen.

EP 1039151 shows a TORX-screw with corresponding tool. The screw has an ordinary TORX slot and a circular recess below this. This recess has the same diameter as the internal diameter of the TORX slot. The recess is very shallow. Even though it is said to prevent the screw from falling off the tool, this shallow recess has in fact very little effect. The screw shown has a cylindrical head. If the head was conical, the depth of the recess would have to be further reduced or the depth of the slot would have to be reduced. In any case it would be difficult to make the recess any deeper than shown, since the diameter is so large.

U.S. Pat. No. 6,017,177 shows a screw with a TORX slot; several embodiments are shown. However, the TORX slot is situated at the bottom of a cavity. Below the TORX slot there is a recess. If the screw head had been conical very little room had been left for the recess. Consequently, this type of screw is limited to cylindrical heads only.

Often, magnetic screw bit holders are used in order to get the screw to sit/hang better on the tool (the bit). However, the bit may easily ride out of the slot if the direction at which the tool is kept deviates from the axial direction of the screw. The depth of the slot is small, and the bit and the slot have opposing tolerance limits within the standard of tolerance. Besides, not all screws are made of magnetic materials.

Several attempts have been made at designing screw slots that alleviate the above-mentioned problem.

A screw that features a slot with a polygonal cross section has been described in GB 2329947. One embodiment shows a screw slot made up of three steps down into the screw head. The top step has the greatest cross sectional area, the next step a slightly smaller cross sectional area, and the lowest step has the smallest cross sectional area. All the steps have a polygonal cross section. The tool for operating this screw incorporates steps with different cross sectional areas, each step complementing a step in the cross section of the slot.

A screw featuring a slot that, in principle, is identical to the above-mentioned slot has been described in GB 1150382. However, this slot consists of only two steps.

The above-mentioned screw slots have a number of serious disadvantages. As all the steps have been designed to transmit torsion, even a minor inaccuracy in the slot will result in a mismatch between the tool and one of the steps, thus making it difficult or impossible to insert the tool into the slot. Even if the tool fits in the slot, it may still be difficult to insert. The tool must be aligned very carefully with the screw slot, which obviously results in loss of time.

The screw slot is of a complex design that may entail an increase in manufacturing costs. However, these manufacturing costs will still be minor compared with the cost of producing a tool as complex as that which is shown in the two above-mentioned publications. The cost of the tool is therefore unduly high.

EP 1039151 screw with corresponding tool. The screw has an ordinary TORX slot and a circular recess below this. This recess has the same diameter as the internal diameter of the TORX slot. The recess is very shallow. Even though it is said to prevent the screw from falling off the tool, this shallow recess have in fact very little effect. The screw shown has a cylindrical head. If the head was conical, the depth of the recess would have to be further reduced or the depth of the slot would have to be reduced. In any case it would be difficult to make the recess any deeper than shown, since the diameter is so large.

U.S. Pat No. 6,017,177 with a TORX slot several embodiments are shown. However, the TORX slot is situated at the bottom of a cavity. Below the TORX slot there is a recess. If the screw head had been conical very little room had been left for the recess. Consequently, this type of screw is limited to cylindrical heads only.

DE 4413782 shows a screw with a first, tapered step for transmission of torsion, the top of which has a circular or hexagonal cross section, and the bottom of which has a hexagonal cross section. Below this is a second, hexagonal step with straight walls.

In addition to the fact that this system has several of the disadvantages that characterise the first two mentioned screw slots, such as the complexity and cost of the tools, the screw slot according to DE 4413782 has a further, considerable disadvantage. If, during operation, the tool is pulled fractionally away from the screw in the axial direction, the tool will disengage from the first tapered step. By so doing, all torsion will be transmitted through the second step alone. This step has a significantly smaller diameter than the first step, and the strain on the tool and the screw increases considerably. Thus, there is a risk of destroying the tool or "rounding" the hole.

EP 257664 shows a cross-slotted screw head in which the upper step is a conventional cross-slot and the lower step is a polygon with straight walls. Both a conventional screwdriver for a cross-slotted screw and a specially adapted screwdriver may be used with this. This slot also has many of the above-mentioned disadvantages. The specially adapted screwdriver is complex and costly to produce. It also has that disadvantage which is common to all generally conical slots, which is that the screwdriver is inclined to move away from the screw in the axial direction. If this happens, the area of contact is reduced, and the strain on the slot and the screwdriver will increase. In particular, the strain on the lower, smaller diameter step will increase, and the tool or the screw may easily be damaged in this area.

The object of the present invention is to provide a system consisting of a slotted screw and a tool, in which good contact is established between the screw and the tool, so as to enable the screw to be held on the tool without falling, off, and in which good contact between the screw slot and the tool is achieved without the risk of a small axial movement of the tool away from the screw significantly increasing the risk of damage to the slot or the tool; in which is achieved a tool that is easy to produce and which does not entail significant cost increases, and in which it is possible to use a conventional, standard tool in a screw slot according to the present invention with the same effect as if it were used in a conventional, standard screw slot.

It is also an object of the present invention to achieve the above-mentioned object without weakening the walls of a conical screw head.

Figure 2:
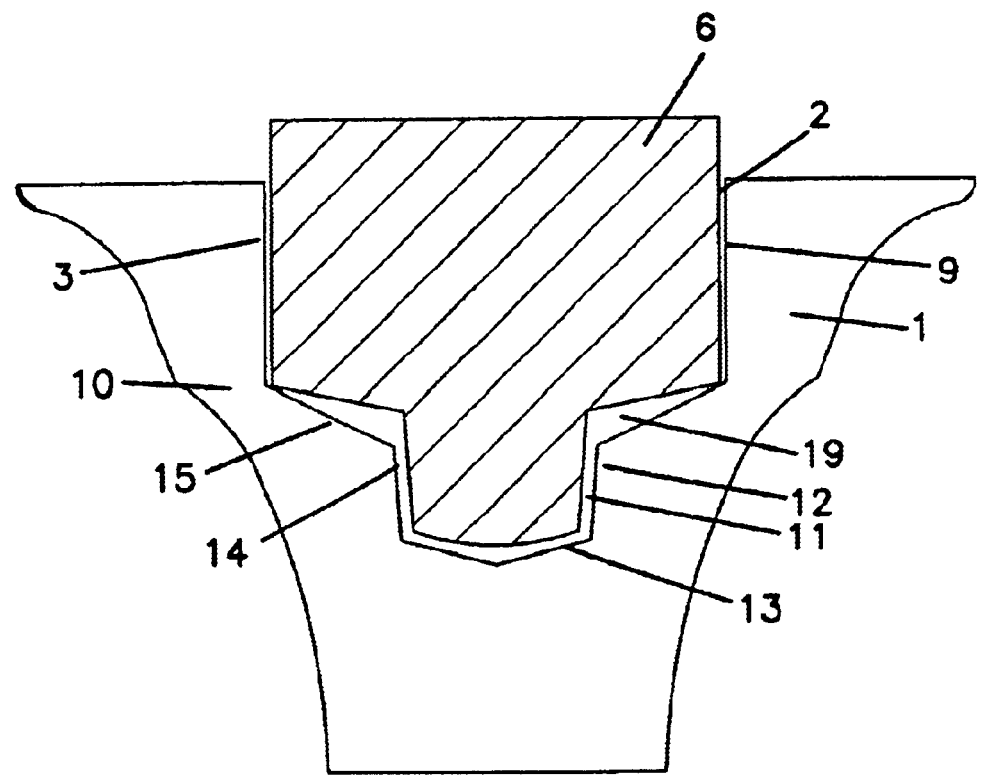
Figure 3:
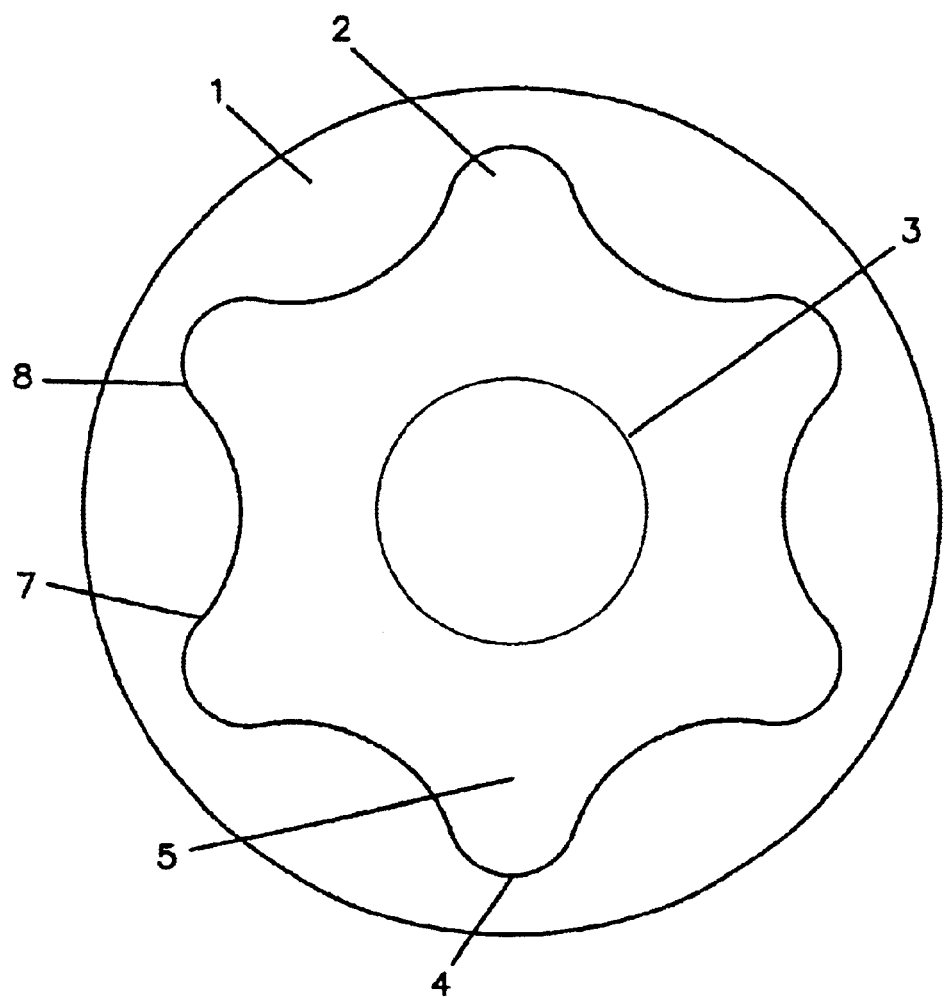

The invention will now be described by way of an example of an embodiment, with reference to the accompanying figures, in which:

FIG. 1 shows a section through a front part of a tool according to the present invention, FIG. 2 shows a section through a screw head with a slot according to the present invention, in which has been placed a tool according to the present invention, and FIG. 3 is a plan view of a screw head with a slot according to the present invention.

The example of an embodiment shows a screw head with a Torx® slot. However, the invention is not limited to this type of slot, and may easily be adapted to other types of slots that feature substantially straight walls. A plan view of a screw head 1 with a Torx® slot 2 is shown in FIG. 3. The slot 2 is a recess 3 in the screw head, shaped as a star with six points, and consisting of rounded points 4 that extend outwards from an imaginary circle 2. Depending on the direction of rotation, a tool 6 (see FIGS. 1 and 2) will engage contacting surfaces 7 and 8 on one side or the other of each point 4.

FIG. 2 shows a section through screw head 1. The recess 3, the walls 9 of which are approximately straight, extends down into the screw head 1. The cross section of the recess 3 retains the shape of a star with six points throughout the straight-walled part. The depth of the recess 3 is limited by the minimum allowable wall thickness 10 at the bottom of the recess 3.

The screw slot 2 according to the present invention comprises a further, central recess 11 at the bottom of the six-pointed recess 3. This central recess 11 has a circular cross section and a significantly smaller diameter than recess 3. The walls 12 of the central recess 11 may be approximately straight, but are preferably slightly inclined so that the bottom 13 of the recess 11 has a diameter that is slightly smaller than that of the upper part 14 of the recess 11.

A downward sloping transition surface 15 is formed between the upper part 14 of the central recess 11 and the walls 9 of the six-pointed recess 3.

The tool 6 has an engagement section 16 that is designed to engage the recess 3. The shape of the engagement section 16 complements the shape of the recess 3, but has a slightly smaller diameter than the recess 3, so as to allow it to be inserted into the recess 3 without difficulties, in the same manner as for existing tool-slot combinations.

The tool also has a central point 17 with a circular cross section. The diameter of the centre point 17 is slightly smaller than that of the central recess 11. A surface 18 extends from the central point 17 to the engagement section 16. The angle of inclination of the surface 18 is smaller than that of the transition surface 15. Thus, a space 19 is formed between the surfaces 15 and 18 when a tool 6 is inserted into the slot 2. The space 19 diverges towards the central point 17. This ensures that the tool engages the walls 9 of the recess 3 across the entire height of the recess 3, thereby ensuring maximum engagement between the engagement section 16 of the tool and the recess 3.

Furthermore, in the case of screws that have undergone surface treatment, the diverging space 19 allows any excess coating to collect in the space 19 without obstructing the engagement between the tool and the slot. If no space 19 had been provided, coating residue would settle on the surface 15 and at the bottom 13 of the recess 11, and thereby prevent sufficient engagement between the tool 6 and the screw slot 2.

The central point 17 and the recess 11 ensure longer-lasting, efficient engagement between the tool 6 and the slot, and allows the screw to remain on the tool without falling off, through friction. The angular movement (wobbling) between the tool and the screw is also reduced considerably.

The central point 17 may, as shown, have a length than is shorter than the height of the recess 3, so as to enable the engagement section 16 of the tool 6 to engage the recess 3 before the central point 17 engages the recess 11. The tool may however also have a central point 17 that is longer than the height of the recess 3, so as to enable the central point 17 to engage the recess 11 before the engagement section 16 engages the recess 3. This facilitates the insertion of the tool into the slot, as the central point 17 is inserted into the recess 3, possibly hits the sloping transition surface 15, and slides into the recess 11. Thus, the tool need only be rotated about the central point 17 in order to bring the engagement section 16 into alignment with the recess 3.

The screw slot does not preclude the use of a conventional tool without a central point 17, but the advantages afforded by the central point 17 and the recess 11 will not be obtained. As such, screws featuring a slot according to the present invention may be produced without considering the types of tool available to craftsmen and others, as the recess 3 is of a conventional design, e.g. the Torx® type.

A craftsman wishing to make use of the advantages of the slot may simply purchase a tool according to the present invention at a later date.

What is claimed is:

1. System comprising a screw and a tool therefore, in which the screw has a screw head with a top surface and a slot, the slot having a first recess adjoining the top surface, the slot having an approximately straight-walled cross section, and the tool is provided with an engagement section that is complementary to the first recess, and where the slot has a second recess at a bottom of the first recess, with a smaller diameter than that of the first recess, and the tool is provided with a central point that complements the second recess, the first recess is shaped as a hexalobular star with six points viewed in an axial direction of the screw, the second recess has a circular cross section, and the central point of the tool has a circular cross section, wherein the screw comprises a transition surface between the first and second recesses, which extends to the second recess at a first angle, and the tool comprises a surface between the engagement section and the central point, which extends to the central point at a second angle, the first angle being steeper than the second angle, so that a space is formed between the transition surface and the surface when the tool is inserted into the slot, the space diverging towards the central point.

2. System according to claim 1, wherein the diameter of the second recess is substantially smaller than the diameter of the first recess.

3. System according to claim 1, wherein the first recess and the second recess have substantially the same depth.

* * * * *

UNITED STATES PATENT AND TRADEMARK OFFICE
CERTIFICATE OF CORRECTION

PATENT NO. : 6,951,158 B1
APPLICATION NO. : 10/089673
DATED : October 4, 2005
INVENTOR(S) : Edland Page 1 of 1

It is certified that error appears in the above-identified patent and that said Letters Patent is hereby corrected as shown below:

Title page, Item (30) Foreign Application Priority Data: "994934" should read --19994934--

Col. 2, lines 26-42: Delete duplicative paragraphs.

Col. 3, line 10: "without falling, off," should read --without falling off,--

Co.. 3, line 40: "imaginary circle 2." should read --imaginary circle.--

Signed and Sealed this

Twenty-third Day of October, 2007

JON W. DUDAS
*Director of the United States Patent and Trademark Office*